United States Patent
Kinlen

(10) Patent No.: US 11,352,509 B2
(45) Date of Patent: Jun. 7, 2022

(54) ORGANICALLY SOLUBLE CONDUCTIVE POLYMERS

(71) Applicant: THE BOEING COMPANY, Chicago, IL (US)

(72) Inventor: Patrick John Kinlen, Fenton, MO (US)

(73) Assignee: THE BOEING COMPANY, Chicago, IL (US)

(*) Notice: Subject to any disclaimer, the term of this patent is extended or adjusted under 35 U.S.C. 154(b) by 112 days.

(21) Appl. No.: 16/703,415

(22) Filed: Dec. 4, 2019

(65) Prior Publication Data

US 2021/0171785 A1 Jun. 10, 2021

(51) Int. Cl.
| | |
|---|---|
| *C09D 5/24* | (2006.01) |
| *C09D 7/20* | (2018.01) |
| *C08G 61/12* | (2006.01) |
| *C09D 165/00* | (2006.01) |

(52) U.S. Cl.
CPC .............. *C09D 5/24* (2013.01); *C08G 61/126* (2013.01); *C09D 7/20* (2018.01); *C09D 165/00* (2013.01); *C08G 2261/11* (2013.01); *C08G 2261/334* (2013.01); *C08G 2261/41* (2013.01); *C08G 2261/514* (2013.01); *C08G 2261/792* (2013.01)

(58) Field of Classification Search
CPC .......... C09D 5/24; C09D 7/20; C09D 165/00; C08G 61/126; C08G 2261/11; C08G 2261/334; C08G 2261/41; C08G 2261/514; C08G 2261/792

See application file for complete search history.

(56) References Cited

U.S. PATENT DOCUMENTS

| | | | | |
|---|---|---|---|---|
| 6,136,909 | A * | 10/2000 | Liao | C08G 73/0266 |
| | | | | 252/500 |
| 2010/0033906 | A1* | 2/2010 | Nobuta | H01B 1/127 |
| | | | | 361/529 |

FOREIGN PATENT DOCUMENTS

| | | |
|---|---|---|
| DE | 102011006751 A1 | 4/2014 |
| EP | 3372633 A2 | 9/2018 |
| EP | 3375826 A1 | 9/2018 |
| WO | 2018009891 A1 | 1/2018 |

OTHER PUBLICATIONS

European Patent Office Extended European Search Report for Application No. 20211787.5-1102/3831896 dated May 12, 2021.
Heraeus Epurio—Clevios™ (2020). Retrieved Mar. 6, 2020, from https://www.heraeus.com/en/hep/products_hep/clevios/clevios_prod/clevios_1.html.

* cited by examiner

*Primary Examiner* — Shane Fang
(74) *Attorney, Agent, or Firm* — Patterson + Sheridan, LLP

(57) ABSTRACT

Polymerize ethylenedioxythiophene (EDOT) in a polymerization process using dinonylnaphthalenesulfonic acid (DNNSA) as the dopant and Fe(III) p-toluenesulfonate (Fe(III) p-TSA) as the oxidizing agent to produce an organically soluble polyethylenedioxythiophene (PEDOT).

20 Claims, 2 Drawing Sheets

ORGANICALLY SOLUBLE CONDUCTIVE POLYMERS

FIELD

Aspects generally relate to polymerization processes, coatings, and articles comprising electrically conductive polymers doped with a sulfonic acid in which the conductive polymers are soluble in organic solvents.

BACKGROUND

Conductive polymers, such as polyethylenedioxythiophene (PEDOT) and polyaniline (PANI) have been proposed for various uses in the manufacture and service of aircrafts, spacecrafts, and other machinery.

In one application, conductive polymers have been proposed as a deicing coating for airfoils, such as wings for aircrafts and rotor blades for rotorcraft vehicles. Conductive polymers can help spread heat from internal and/or external heating elements to desired area of the airfoils. In another application, conductive polymers have been proposed as an electrostatic dissipative coating. A surface of a vehicle, such as an aircraft, builds static charge when in motion. For example, a nose and/or airfoils of an aircraft may build a form of static electricity known as precipitation static. Precipitation static may negatively impact the electronics of an aircraft, such as radar located behind the nose of the aircraft. In still another application, conductive polymers have been proposed as a chromate-free corrosion protection coating. Metals, such as steel, aluminum, aluminum alloys, and galvanized metals, used in the manufacture of aircrafts, spacecrafts, and other machinery are susceptible to corrosive attack. Chromates, such as zinc salts of hexavalent chromium, have been used as corrosion inhibitors in corrosion inhibiting coatings. There is a desire to reduce the amount of chromate used in coatings and other applications to be more environmentally friendly. Conductive polymers can provide corrosion protection to aircrafts, spacecrafts, and other machinery as a primer, a sealant, a base coat, an intermediate coat, or a topcoat. Conductive polymers help to passivate metal surfaces by shifting the corrosion potential of the metal surfaces.

Conductive polymers typically contain dopants to charge the polymer backbone. For example, PEDOT can utilize polystyrene sulfonic acid (PSSA) as a counter anion (dopant) to the positively charged PEDOT polymer backbone. However, PEDOT:PSSA polymers are limited in its applications since the polymers are only soluble in aqueous solvents and are incompatible with binder resins which are soluble in organic solvents. For example, PANI utilizes dinonylnapthalenesulfonic acid (DNNSA) as a counter anion dopant. Although PANI:DNNSA is soluble in organic solvents it is not generally compatible with components used to form epoxy or polyurethane coatings. Also, PANI:DNNSA has limited thermal stability and typically decomposes at around 150° C. In addition, conductive polymers may require a post-treatment, such as an isopropyl alcohol (IPA) post-treatment wash, to increase the conductivity of the polymers. However, such post-treatments increase manufacturing and service time and costs.

Therefore, there is a need for an improved conductive polymer.

SUMMARY

In one aspect, a method of producing an electrically conductive polymer that is soluble in an organic solvent includes reacting ethylenedioxythiophene (EDOT) monomers, a transition-metal p-toluenesulfonic acid (p-TSA) as an oxidizing agent, and a sulfonic acid to form polyethylenedioxythiophene (PEDOT) doped with a plurality of anions of the sulfonic acid in a reaction product mixture. The reaction product mixture is washed with an aqueous solution. The PEDOT doped with anions of the sulfonic acid is retained in an organic phase of the reaction product mixture. The PEDOT doped with anions is isolated from the organic phase.

In another aspect, a method of forming a conductive polymer coating over a substrate includes dissolving polyethylenedioxythiophene (PEDOT) doped with a plurality of anions and a binder resin in an organic solvent to form a conductive polymer coating composition. The conductive polymer coating composition is applied over the substrate to form the conductive polymer coating. The conductive polymer coating is dried at a temperature less than 100° C. for a time period of at least one hour.

In one aspect, a conductive polymer coating formed on a surface includes polyethylenedioxythiophene (PEDOT) doped with a plurality of dinonylnapthalenesulfonic acid (DNNSA) anions. The PEDOT has a resistivity of about 100,000 Ohms or less. The surface is selected from a group consisting of a metal surface, a carbon allotrope surface, an edge protection layer surface, and a spacecraft surface.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
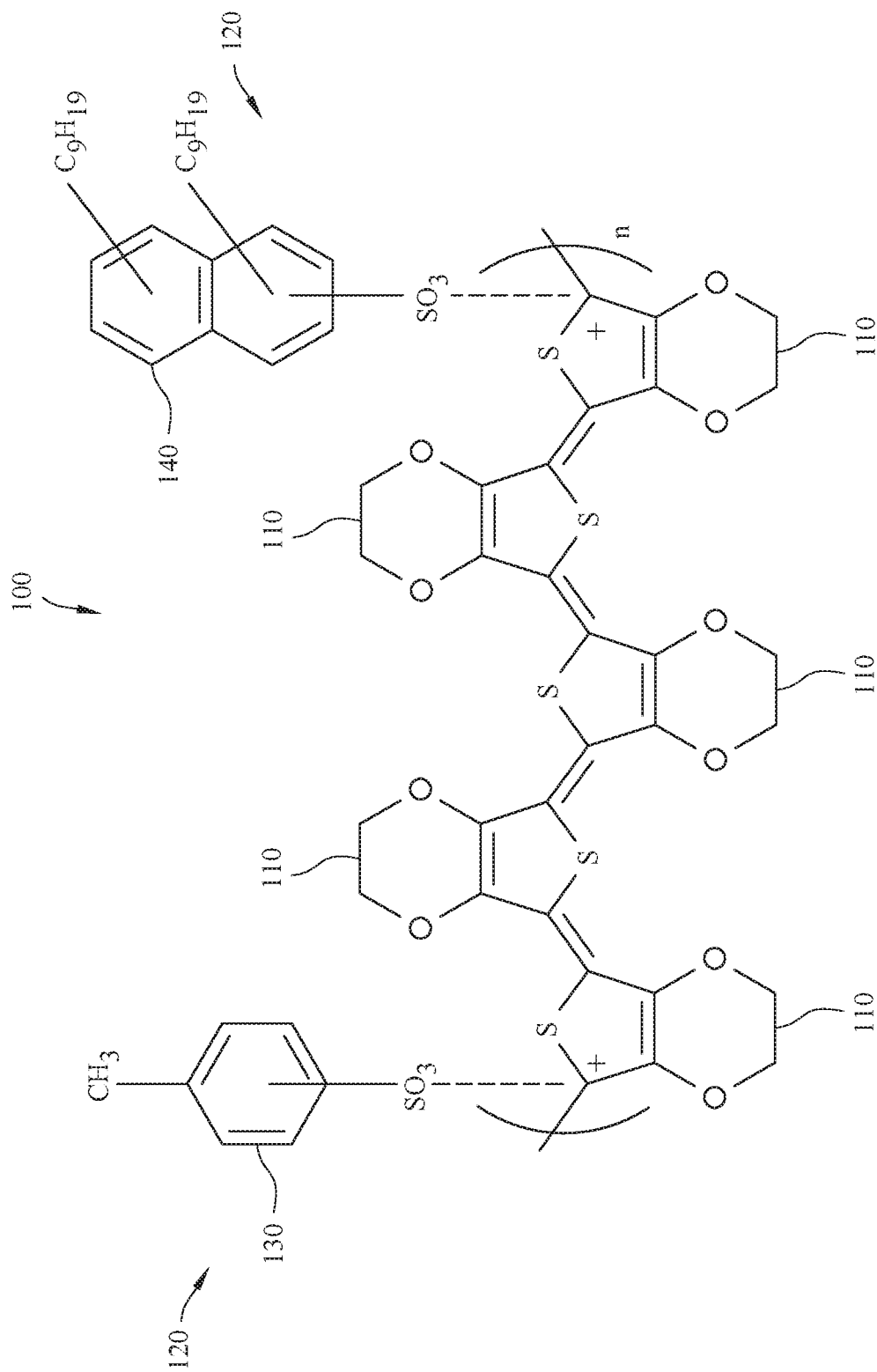
FIG. 1 is an example illustrating polyethylenedioxythiophene (PEDOT) comprising unfunctionalized EDOT monomer units doped with anions.

Some aspects will now be described in greater detail below, including specific aspects, versions and examples, but the present disclosure is not limited to these aspects, versions or examples, which are included to enable a person having ordinary skill in the art to make and use aspects, when the information in the present disclosure is combined with available information and technology.

Various terms as used herein are defined below. To the extent a term used in a claim is not defined below, it should be given the broadest definition persons in the pertinent art have given that term as reflected in one or more printed publications or issued patents.

All documents described herein are incorporated by reference herein, including any priority documents and/or testing procedures to the extent they are not inconsistent with this text. As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The present conductive polymers are soluble in organic solvents. The conductive polymers can be used in coating compositions with binder resins in organic solvents to form conductive polymer coatings. For example, a conductive polymer can be poly(3,4-ethylene dioxythiophene) (PEDOT) synthesized by oxidation of 3,4-ethylene dioxythiophene (EDOT) with dinonylnaphthalenesulfonic acid (DNNSA) forming a dopant anion with a transition-metal p-toluenesulfonic acid (p-TSA) as an oxidizing agent. The resulting product PEDOT doped with DNNSA is electrically conductive and soluble in organic solvents. Oxidative chemical polymerization can produce industrial amounts of PEDOT:DNNSA conductive polymers. The present PEDOT:DNNSA conductive polymers can be dissolved in organic solvents and applied to form coatings over surfaces of an aircraft, spacecraft, marinecraft, or other machinery as a deicing coating, an electrostatic dissipative coating, a corrosion protection coating, or other suitable application. In certain aspects, post-treatments of the formed coatings, such as thermal curing above 100° C. and/or an organic solvent wash, are unnecessary to form conductive polymer coatings, such as PEDOT:DNNSA conductive polymer coatings, with high conductivity.

Conductive polymers can be synthesized by various reactions, including oxidative chemical polymerization, electrochemical polymerization, radical polymerization, plasma polymerization, vapor-phase polymerization, and other processes. In certain aspects, the conductive polymers are synthesized by oxidative chemical polymerization with an oxidant acting as a catalyst. Examples of oxidants include transition-metal p-toluenesulfonic acid (p-TSA), transition-metal tetrasulfonated phthalocyanine (TSPc), ammonium persulfate (APS), other persulfates, other peroxides, and other oxidants. In certain aspects, oxidants of Fe(III) p-toluenesulfonate (Fe (III) p-TSA) are used to form conductive polymers in oxidative chemical polymerization processes. Oxidative chemical polymerization process can have one or more of the following attributes: a polymerization process conducted at about room temperature, formation of a conductive polymer soluble in an organic solvent, and/or formation of a conductive polymer coating without the need for a post-treatment.

Conductive polymers can be polyethylenedioxythiophene (PEDOT), propylenedioxythiophene (ProDOT), polyaniline (PANI), polythiophene, polypyrrole, polyacetylene, poly (phenylene vinylene), poly(styrenesulfonate) (PSS), or other conductive polymers. In certain aspects, the conductive polymers are PEDOTs due to their high conductivity in comparison to other conductive polymers, such as in comparison to ProDOT. PEDOT is made by polymerizing monomers of unfunctionalized or functionalized 3,4-ethylenedioxythiophene (EDOT) or derivatives thereof. In certain aspects, PEDOT is may be polymerizing unfunctionalized EDOT. Using functionalized EDOT may undesirably increase the manufacturing costs of PEDOT and/or may undesirably reduce the solubility of PEDOT in an organic solvent.

Conductive polymers, such as PEDOT, can be doped with anions. Example dopants of conductive polymers that form anions include sulfonic acids, thiols, and other suitable organic acids. Organic acids of the general formula (HA) can dissociate into H+ and an Anion$^-$. Sulfonic acids have the general formula (R—S($=$O)$_2$—OH), in which R is an alkyl, an aryl, an alkylaryl, and other suitable groups. Sulfonic acids of the general formula (R—S($=$O)$_2$—OH) can dissociate into H+ and a R—S($=$O)2-O$^-$ anion. The anion of the organic acid HA can be one of the dopants in the conductive polymers. For sulfonic acids, the acid can be deprotonated to produce at least one proton and at least one R—S($=$O)2-O$^-$ anion which can be one of the dopants in the conductive polymers, such as PEDOT.

In one aspect, a sulfonic acid of dinonylnapthalenesulfonic acid (DNNSA) and isomers thereof is used to dope the conductive polymer, such as PEDOT. Along with increasing the conductivity of conductive polymers, DNNSA enhances the solubility and processing of conductive polymers, such as PEDOT, in organic solvents. Other sulfonic acids can be methylnaphthylsulfonic acid, ethylnaphthylsulfonic acid, propylnaphthylsulfonic acid, butylnaphthylsulfonic acid, pentylnaphthylsulfonic acid, hexylnaphthylsulfonic acid, heptylnaphthylsulfonic acid, octylnaphthylsulfonic acid, nonylnaphthylsulfonic acid, decylnaphthylsulfonic acid, dimethylnaphthylsulfonic acid, diethylnaphthylsulfonic acid, dipropylnaphthylsulfonic acid, dibutylnaphthylsulfonic acid, dipentylnaphthylsulfonic acid, dihexylnaphthylsulfonic acid, diheptylnaphthylsulfonic acid, dioctylnaphthylsulfonic acid, didecylnaphthylsulfonic acid, dodecylbenzenesulfonic acid (DBSA), disulfonic acids thereof, and isomers thereof.

Cation dopants can be associated with the anions of the doped PEDOT. For example, cation dopants can be associated with the negatively charged sulfonate anions of DNNSA or P-TSA of the doped PEDOT. Cation dopants include cerium, molybdenum, magnesium, zirconium, titanium, vanadium, hafnium, silicon, aluminum, boron, cobalt, zinc, and other metallic ions.

FIG. 1 is an example illustrating PEDOT 100 comprising unfunctionalized EDOT monomer units 110 doped with anions 120. As shown in FIG. 1, PEDOT 100 was synthesized by an oxidant of transition-metal p-toluenesulfonic acid (p-TSA), such as Fe (III) p-TSA. The PEDOT 100 can include the p-TSA anion 130 as one of the dopants in the backbone of the PEDOT polymer chain. The PEDOT 100 may further be synthesized with or redoped with a sulfonic acid, such as DNNSA. In certain aspects, the PEDOT 100 includes p-TSA anions 130 and DNNSA anions 140. In certain aspects, the PEDOT 100 includes DNNSA anions 140 with minor amounts of p-TSA anions. For example, the PEDOT doped with p-TSA can be dedoped to form dedoped PEDOT. The dedoped PEDOT can be redoped with DNNSA anions.

Figure 2:
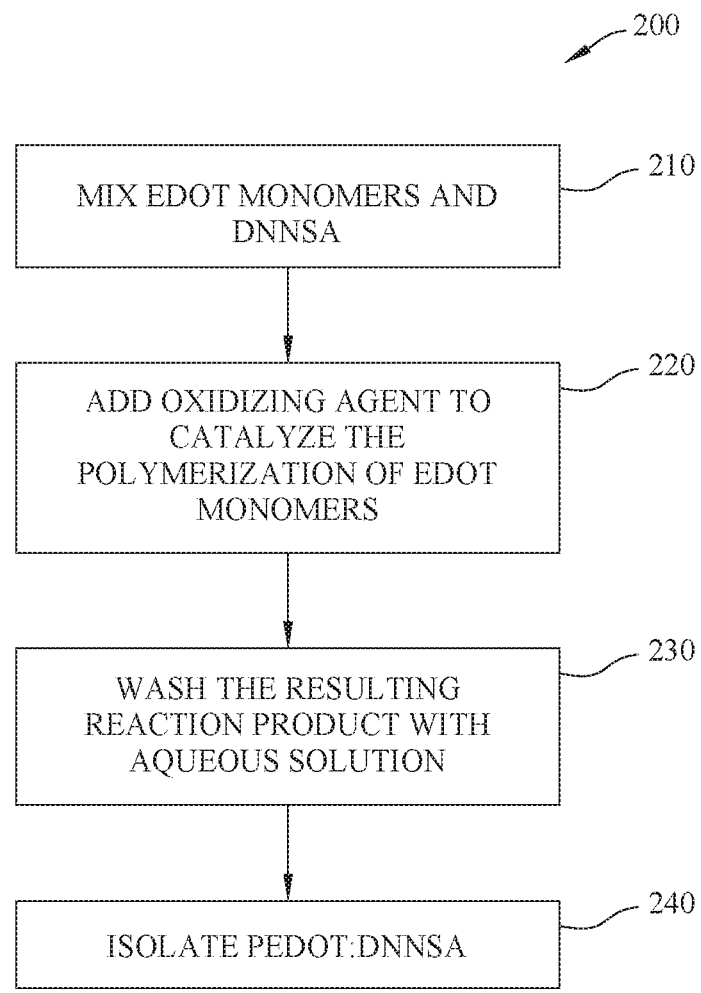
FIG. 2 is an example illustrating a process of synthesizing PEDOT by chemical oxidation and doping PEDOT with anions.

FIG. 2 is an example illustrating a process 200 of synthesizing PEDOT by chemical oxidation and doping PEDOT with anions.

At block 210, EDOT monomers and DNNSA are mixed together. DNNSA is available from King Industries located in Norwalk, Conn. as a solution in organic solvent. In certain aspects, a molar ratio of DNNSA to EDOT monomers is about 1.0 or greater. It is believed that a molar ratio of DNNSA to EDOT monomers of 1.0 or greater can provide a PEDOT that is substantially doped with DNNSA anions to available anion dopant sites within the PEDOT polymer backbone. The DNNSA anions replace oxidizing agent anions or competes with oxidizing agents to occupy cations sites within the PEDOT polymer backbone. A higher ratio of DNNSA anions versus oxidizing agent anions doped within the PEDOT polymer backbone provides increased solubility of the PEDOT in organic solvents.

At block 220, an oxidizing agent is added to the EDOT/DNNSA solution. In certain aspects, the oxidizing agent is a transition-metal p-toluenesulfonic acid (p-TSA), such as Fe (III) p-TSA. In certain aspects, a molar ratio of transition-metal p-TSA to EDOT monomers is about 1.0 or greater. While not being bound by any particular theory, it is believed that a molar ratio of transition-metal p-TSA to EDOT monomers of 1.0 or greater causes a high rate of polymerization causing intertwining of PEDOT polymer chains. A molar ratio of transition-metal p-TSA to EDOT monomers of less than 1.0 may result in formation of discrete PEDOT polymer chains. Intertwined PEDOT polymer chains used in a coating exhibit lower resistivity compared to discrete PEDOT polymer chains due to the larger aggregated particle size of intertwined PEDOT polymer chains compared to discrete PEDOT polymer chains.

Additional water can be added to the mixture to improve the dispersion of the oxidizing agent within the mixture. The EDOT monomers, DNNSA, and oxidizing agent can be mixed together until substantial completion of the reaction, such as from about 1 hour to about 72 hours. The polymerization reaction can be conducted at about room temperature. For example, there is no need to actively cool the reaction mixture below room temperature or to active heat the reaction mixture above room temperature.

In certain aspects, polymerizing EDOT monomers in the presence of DNNSA reduces manufacturing costs of EDOT by avoiding additional steps of dedoping PEDOT and redoping PEDOT with DNNSA anions and/or by avoiding additional isolation steps which would reduce the yield.

At block 230, the resulting reaction product is washed with an aqueous solution to form organic and aqueous phases. Additional amounts of organic solvent, such as toluene, xylene, or other suitable organic solvents, and additional amounts of water can be added to the reaction product. Suitable organic solvents include organic solvents with a dipole moment of less than 1.5. The organic and aqueous phases are separated to retain the organic phase. PEDOT is soluble in the organic solvent. Unreacted oxidizing agent and other impurities are retained in the aqueous phase. Organic solvents with a dipole moment of 1.5 or greater may not form distinct phases with water to separate the PEDOT from unreacted oxidizing agent and impurities.

The reaction product is washed one or more times with water. In certain aspects, the reaction product is washed with a non-alkaline aqueous solution, such as water or a dilute acidic solution. Washing with an alkaline aqueous solution may undesirably remove DNNSA dopants from the PEDOT polymer backbone which could undesirably increase the resistivity of the resulting PEDOT.

At block 240, PEDOT doped with DNNSA is isolated from the washed reaction product in the organic solvent. Isolation techniques include rotary evaporation to remove the organic solvent, precipitation, filtering, other isolation techniques, and combinations thereof. The PEDOT:DNNSA conductive polymer can be air dried or dried with heated forced air at a temperature of about 100° C. or less. In certain aspects, drying of conductive polymers at temperature greater than 100° C. may cause over oxidation of the conductive polymers resulting in increasing the resistivity of the polymer. The synthesis process 200 can be scalable using batch or flow synthetic processes to yield soluble conductive polymers.

The PEDOT:DNNSA conductive polymers can be used in a various applications. PEDOT:DNNSA and a binder resin can be mixed together in an organic solvent to form a composition to be applied over a substrate to form a coating. Since PEDOT:DNNSA is soluble in an organic solvent, the PEDOT:DNNSA is compatible with a binder resin. Examples of binder resins include polyvinyl butyral, ethylene-vinyl acetate, acrylic, polyimide, polyolefin, polyurethane, silicone, polyvinylchloride, nitrile rubber, and other binder resins.

The coatings comprising PEDOT:DNNSA with or without binder resins can be used as a deicing coating over aircraft and rotorcraft surfaces. The PEDOT:DNNSA coatings are compatible with edge erosion protection layers (such as titanium, nickel, and polyurethane) disposed on or adjacent to airfoil surfaces, such as a surface of a rotor blade. Since edge erosion coatings are typically thermally insulative, conductive polymer coatings of PEDOT:DNNSA over or adjacent to the edge erosion coatings can provide sufficient current densities to de-ice the aircraft surfaces. A PEDOT:DNNSA coating has sufficient durable erosion impact protection for longevity from harsh environments until the next service interval of an aircraft.

The coatings comprising PEDOT:DNNSA with or without binder resins can be used over or within a carbon allotrope material. Carbon allotrope material comprises single-walled carbon nanotubes (SWNTs), carbon fibers, and other carbon materials. The carbon allotrope material can be in any suitable form such as non-woven sheets or woven sheets. The PEDOT:DNNSA can enhance the conductivity of articles fabricated by carbon allotrope materials, such as at the interface of multiple sub-components of an article made of carbon allotrope materials.

A coatings comprising PEDOT:DNNSA with or without binder resins can be used as a primer coating or a tie coating over aircraft and rotorcraft surfaces. A PEDOT:DNNSA coating can provide corrosion resistance since it shifts the corrosion potential of the coated surface. A PEDOT:DNNSA corrosion resistance coating can be free of chromates. A PEDOT:DNNSA coating is compatible with various top coatings, such as epoxy and polyurethane top coatings, formed on the PEDOT:DNNSA coating. In comparison, PANI:DNNSA chemically reacts with epoxies and polyurethane precursors limiting the lifetime of a PANI:DNNSA coating or an epoxy/polyurethane top coating on the PANI:DNNSA coating.

A coatings comprising PEDOT:DNNSA with or without binder resins can be used as coating of a spacecraft surface, such as a satellite surface. Static charge builds up on the surface of a spacecraft due to the low density plasma and electrons of space or from high altitude atmosphere of planets. For example, solar panel surfaces and optical devices of spacecrafts are coated with a dielectric material which can easily build up static charge. Discharge of static electricity built up over a spacecraft may damage spacecraft components. A spacecraft surface coating comprising PEDOT:DNNSA can dissipate static charge buildup. A spacecraft surface coating comprising PEDOT:DNNSA can be transparent individually or can be transparent with a transparent binder and can be used to coat solar panels and other optical devices.

The coatings comprising PEDOT:DNNSA as applied have a low resistivity of about 100,000 Ohms/square or less, such as about 10,000 Ohms/square or less, such as about 1,000 Ohms/square or less, without undergoing a post treatment, such as a post wash or a post cure.

In certain aspects, PEDOT:DNNSA coating does not require a post wash of the coating with an organic solvent of isopropyl alcohol, dimethyl sulfoxide, methanol, or other organic solvents. A post wash of conductive polymer coatings are used to remove impurities and defects that can reduce the carrier mobility of the conductive polymer coatings. It is believed that for the examples of PEDOT:DNNSA synthesized with a transition-metal p-toluenesulfonic acid (p-TSA) the polymer backbone of PEDOT can be substantially filled by DNNSA anions and/or pTSA anions at available anion dopant sites which reduces the need for a post treatment to remove impurities from PEDOT.

An optional post wash of a coating comprising PEDOT:DNNSA with of isopropyl alcohol, dimethyl sulfoxide, methanol, or other organic solvents can be performed to form a coating with a low resistivity of about 50,000 Ohms/square or less, such as about 5,000 Ohms/square or less, such as about 500 Ohms/square or less as measured by the conductivity of PEDOT:DNNSA alone without any binder resins.

In certain aspects, PEDOT:DNNSA coating does not require a post thermal curing treatment of heating a coated substrate to above 100° C. Post thermal curing treatments of heating a coated substrate to above 100° C. are used to increase the cross-linking of other conductive polymer coatings. The present PEDOT:DNNSA due not require thermal curing heating a coated substrate to above 100° C. since the PEDOT:DNNSA polymer chains are sufficiently intertwined together. It has been found that thermal curing of heating a coated substrate to above 100° C. may negatively increase the PEDOT:DNNSA by oxidizing the polymer backbone of PEDOT.

Aspects

Clause 1. A method of producing an electrically conductive polymer that is soluble in an organic solvent, comprising introducing ethylenedioxythiophene (EDOT) monomers, a transition-metal p-toluenesulfonic acid (p-TSA), and a sulfonic acid to form a product mixture comprising polyethylenedioxythiophene (PEDOT) doped with a plurality of anions of the sulfonic acid; washing the product mixture with an aqueous solution; retaining an organic phase of the product mixture, the organic phase comprising PEDOT doped with anions of the sulfonic acid; and isolating the PEDOT doped with anions from the organic phase.

Clause 2. The method of clauses 1 or 3-8, wherein the EDOT monomers are unfunctionalized monomers.

Clause 3. The method of clauses 1-2 or 4-8, wherein the transition-metal p-TSA is Fe (III) p-TSA.

Clause 4. The method of clauses 1-3 or 5-8, wherein the sulfonic acid is dinonylnapthalenesulfonic acid (DNNSA).

Clause 5. The method of clauses 1-4 or 6-8, wherein the sulfonic acid and the EDOT monomers are provided in a molar ratio the sulfonic acid to the EDOT monomers of about 1.0 or greater.

Clause 6. The method of clauses 1-5 or 7-8, wherein the transition-metal p-TSA and the EDOT monomers are provided in a molar ratio of the transition-metal p-TSA to the EDOT monomers of about 1.0 or greater.

Clause 7. The method of clauses 1-6 or 8, wherein with the aqueous solution is a non-alkaline aqueous solution.

Clause 8. The method of clauses 1-7, wherein the EDOT monomers, the transition-metal p-toluenesulfonic acid (p-TSA), and the sulfonic acid are reacted at room temperature.

Clause 9. A method of forming a conductive polymer coating over a substrate, comprising dissolving polyethylenedioxythiophene (PEDOT) doped with a plurality of anions and a binder resin in an organic solvent to form a conductive polymer coating composition; applying the conductive polymer coating composition over the substrate to form the conductive polymer coating; and drying the conductive polymer coating at a temperature less than 100° C. for a time period of at least one hour.

Clause 10. The method of clauses 9 or 11-14, further comprising applying a top coating over the conductive polymer coating without a post treatment over the conductive polymer coating.

Clause 11. The method of clauses 9-10 or 12-14, wherein the PEDOT comprises unfunctionalized monomer units.

Clause 12. The method of clauses 9-11 or 13-14, wherein PEDOT is doped with the anions, and the anions are selected from a group consisting of p-TSA anions, dinonylnapthalenesulfonic acid anions, and combinations thereof.

Clause 13. The method of clauses 9-12 or 14, further comprising synthesizing PEDOT doped with anions by reacting ethylenedioxythiophene (EDOT) monomers and a transition-metal p-toluenesulfonic acid (p-TSA).

Clause 14. The method of claim 9-13, further comprising post washing the conductive polymer coating with another organic solvent.

Clause 15. A conductive polymer coating formed on a surface, comprising polyethylenedioxythiophene (PEDOT) doped with a plurality of dinonylnapthalenesulfonic acid (DNNSA) anions, the PEDOT having a resistivity of about 100,000 Ohms or less, wherein the surface is selected from a group consisting of a metal surface, a carbon allotrope surface, an edge protection layer surface, and a spacecraft surface.

Clause 16. The conductive polymer coating of clauses 15 or 17-20, wherein the surface is the metal surface and the conductive polymer coating provides corrosion protection.

Clause 17. The conductive polymer coating of clauses 15-16 or 18-20, wherein the conductive polymer coating is free of chromates.

Clause 18. The conductive polymer coating of clauses 15-17 or 19-20, wherein the surface is the carbon allotrope surface and the conductive polymer coating is a deicing coating.

Clause 19. The conductive polymer coating of clauses 15-18 or 20, wherein the surface is the edge protection layer surface over an airfoil of an aircraft.

Clause 20. The conductive polymer coating of clauses 15-19, wherein the surface is the spacecraft surface.

EXAMPLE

Example 1—PEDOT Formed by APS 150 g of DNNSA 50 wt % in an organic solvent was added to a 500 ml OptiMax reactor at about 25° C. The solution was stirred. 10 g of EDOT was added to the solution. Then, 11080 g of water was added to the mixture. The mixture was cooled to about 5° C. 50 ml of ammonium persulfate was dosed into the mixture over about 30 minutes. The mixture was stirred for about 17 hours. Then, the mixture was heated to about room temperature.

The crude product was removed from the reactor and transferred to a separation funnel. 200 ml of 0.01 M $H_2SO_4$ was added to the separation funnel followed by adding 200 ml xylene. 3 phases were observed to form: (1) a lower clear phase; (2) a middle dense greenish phase; and (3) an upper cloudy phase. 100 ml of 1 M $H_2SO_4$ was then added to the separation funnel to aid in separation. A two phase system formed with an upper green-blue toluene layer and a lower cloudy white aqueous layer. The lower aqueous layer was removed and the remaining blue-gray toluene upper layer was washed with 200 ml of 1 M $H_2SO_4$. The crude product was then washed twice with 200 ml portions each of 0.01 M $H_2SO_4$ followed by 200 ml portions each of DI water.

The washed toluene layer was transferred to a tear drop flask and rotary evaporated down to concentrate. The bath temperature was set to about 70° C. and vacuum increased slowly to avoid bumping over to produce about 75 ml of the isolated product.

After storage for over one month, the isolated product was observed to be dark green in color. The isolated product was soluble in toluene to give a green solution. An IR spectra was conducted of the isolated product to give the typical peaks of PEDOT:DNNSA. The isolated product was spin casted onto a microscope slide. The sheet resistance of the PEDOT: DNNSA coating measured to be about $2.4 \times 10^{10}$ ohms/square. Sheet resistance was measured using a four point probe measurement at the perimeter of the thin film over the microscope slide. An IPA post-treatment was of the PEDOT: DNNSA coating was conducted and the sheet resistance of the resulting coating was measured to be about $5.4 \times 10^7$ ohms/square. The isolated product was insoluble in water.

Example 2: PEDOT Formed by Fe p-TSA 1.398 g (0.009833 moles) of EDOT, 10.7 g (0.011595 moles) of DNNSA in a 50 wt % solution of 2-butoxyethanol (available from King Industries located in Norwalk, Conn.) and 11.363 g of water was added to a round bottom flask and was stirred with a magnetic stirrer. 4.886 g (0.007212 moles) of Fe (III) p-TSA and 10.388 of water was mixed together to form a catalyst solution. The Fe (III) p-TSA to EDOT mole ratio was about 0.733. The DNNSA to EDOT mole ratio was about 1.1791.

The catalyst solution was added to the aqueous monomer solution with a dropping funnel. The reaction proceeded for about 10 hours at about room temperature without any external temperature control.

After stirring the reaction medium overnight, a blue-gray product formed. The mixture was transferred to a separation funnel and upon standing formed a yellow upper layer and a blue-gray lower layer.

A small portion of the lower product layer was washed with 0.5 M sulfuric acid followed by washing with water. The product layer, now the upper layer, was removed with a pipette, dried under nitrogen and dissolved in toluene. A thin film of the material was cast on a microscope slide and a sheet resistance of $1.5 \times 10^9$ ohms/square was measured. Sheet resistance was measured using a four point probe measurement at the perimeter of the thin film over the microscope slide. Post washing the film with IPA decreased the sheet resistance to $1.9 \times 10^7$ ohms/square.

Example 3: PEDOT Formed by Fe p-TSA 1.398 g (moles 0.009833) of EDOT, 10.7 g (0.011595 moles) of DNNSA in a 50 wt % solution of 2-butoxyethanol (available from King Industries located in Norwalk, Conn. catalyst) and 11.363 g of water was added to a round bottom flask and was stirred with a magnetic stirrer. 4.886 g (0.007212 moles) of Fe (III) p-TSA and 10.388 of water was mixed together to form a catalyst solution. The Fe (III) p-TSA to EDOT mole ratio was about 0.733. The DNNSA to EDOT mole ratio was about 1.1791.

The catalyst solution was added to the aqueous monomer solution with a dropping funnel. The reaction proceeded for about 10 hours at about room temperature without any external temperature control.

After stirring the reaction medium overnight, a blue-gray product formed. The mixture was transferred to a separation funnel and upon standing formed a yellow upper layer and a blue-gray lower layer. The lower product layer (about 11.4 grams) was separated from the yellow upper layer.

One portion of the lower product material was coated onto a microscope slide and dried at 70° C. A sheet resistance of $4.6 \times 10^4$ was measured. Sheet resistance was measured using a four point probe measurement at the perimeter of the thin film over the microscope slide. Post washing the film with IPA decreased the sheet resistance to $7.3 \times 10^3$ ohms/square. The film was deep blue in color.

Another portion of the lower product material was washed with 2 M sulfuric acid followed by washing two times by equal volumes of deionized water. The crude product was then reduced in volume by rotary evaporation followed by toluene additions and distillation to azeotropically remove water from the product. The product was found to be dispersible in toluene, but not soluble. When 1 M NaOH was added to the dispersion of the product in toluene, an orange lower layer appeared which most likely is due to extraction of residual iron (II) to form ferrous hydroxide/oxides. After the NaOH wash, the product was washed with water. The organic phase was isolated and a portion cast onto a microscope slide. A sheet resistance of $4.4 \times 10^{10}$ Ohms/square was measured after drying at 70° C.

Example 4: PEDOT Formed by Fe p-TSA 1.995 g (0.014032 moles) of EDOT, 22.4 g (0.024266 moles) of DNNSA in a 50 wt % solution of 2-butoxyethanol (available from King Industries located in Norwalk, Conn. catalyst) and 20.335 g of water was added to a round bottom flask and was stirred with a magnetic stirrer. 10.87 g (0.016044 moles) of Fe (III) p-TSA and 23.699 of water was mixed together to form a catalyst solution. The Fe (III) p-TSA to EDOT mole ratio was about 1.143. The DNNSA to EDOT mole ratio was about 1.7293.

The catalyst solution was added to the aqueous monomer solution with a dropping funnel. The reaction proceeded for about 10 hours at about room temperature without any external temperature control.

After allowing the reaction to proceed for about 20 hours, the mixture was transferred to a separation funnel with the addition of 25 ml of toluene. An upper blue-gray phase resulted with a lower yellow aqueous layer. The lower layer was removed and the product washed three times with 25 ml portions of deionized water.

The resulting crude product was cast onto microscope slides yielding a brown film. After heating the slides at a temperature above 100° C., the color of the film turned blue. It may be that the reaction is driven to completion by the heating process. A sheet resistance of $1.7 \times 10^9$ ohms/square was measured. Sheet resistance was measured using a four point probe measurement at the perimeter of the thin film over the microscope slide.

Example 5: PEDOT Formed by Fe p-TSA 1.995 g (0.014032 moles) of EDOT, 22.4 g (0.024266 moles) of DNNSA in a 50 wt % solution of 2-butoxyethanol (available from King Industries located in Norwalk, Conn. catalyst) and 20.335 g of water was added to a round bottom flask and was stirred with a magnetic stirrer. 10.87 g (0.016044 moles) of Fe (III) p-TSA and 23.699 of water was mixed together to form a catalyst solution. The Fe (III) p-TSA to EDOT mole ratio was about 1.143. The DNNSA to EDOT mole ratio was about 1.7293.

The catalyst solution was added to the aqueous monomer solution with a dropping funnel. The reaction proceeded for about 10 hours at about room temperature without any external temperature control.

After allowing the reaction to proceed for about 20 hours, the mixture was transferred to a separation funnel with the addition of 25 ml of toluene. An upper blue-gray phase resulted with a lower yellow aqueous layer. The lower layer was removed and the product washed three times with 25 ml portions of deionized water.

The resulting crude product was cast onto microscope slides yielding a brown film. The film was allowed to dry overnight at 70° C. and a sheet resistance of 736 ohms/square was measured. Sheet resistance was measured using a four point probe measurement at the perimeter of the thin film over the microscope slide. After post washing the film in isopropyl alcohol, the sheet resistance decreased further to 399 ohms/square.

While the foregoing is directed to aspects of the present disclosure, other and further aspects of the disclosure may be devised without departing from the basic scope thereof, and the scope thereof is determined by the claims that follow.

What is claimed is:

1. A method of producing an electrically conductive polymer that is soluble in an organic solvent, comprising:
    forming a first solution comprising ethylenedioxythiophene (EDOT) monomers and dinonylnapthalenesulfonic acid (DNNSA);
    introducing a transition-metal p-toluenesulfonic acid (p-TSA) with the first solution, wherein a molar ratio of transition-metal p-TSA to EDOT monomers is about 1 or greater, to form a product mixture comprising polyethylenedioxythiophene (PEDOT) doped with a plurality of anions of the DNNSA and p-TSA, wherein a molar ratio of DNNSA anions to p-TSA anions is about 1 or greater;
    washing the product mixture with an aqueous solution;
    retaining an organic phase of the product mixture, the organic phase comprising the PEDOT doped with anions of the DNNSA and the p-TSA; and
    isolating the PEDOT doped with anions of the DNNSA and the p-TSA from the organic phase.

2. The method of claim 1, wherein the EDOT monomers are unfunctionalized monomers.

3. The method of claim 1, wherein the transition-metal p-TSA is Fe (III) p-TSA.

4. The method of claim 1, wherein the DNNSA and the EDOT monomers are provided in a molar ratio of the DNNSA to the EDOT monomers of about 1 or greater.

5. The method of claim 1, wherein the aqueous solution is a non-alkaline aqueous solution.

6. The method of claim 1, wherein the EDOT monomers, the transition-metal p-toluenesulfonic acid (p-TSA), and the DNNSA are reacted at room temperature.

7. The method of claim 1, further comprising drying the PEDOT doped with anions at a temperature, wherein the temperature is not greater than 100° C.

8. The method of claim 1, further comprising introducing a resin to the PEDOT doped with the anions of the DNNSA and the p-TSA to form a mixture.

9. The method of claim 8, wherein the resin is selected from the group consisting of polyvinylbutyral, ethylene-vinyl acetate, polyimide, polyolefin, polyurethane, silicone, polyvinylchloride, nitrile rubber, and combinations thereof.

10. The method of claim 9, wherein the resin is polyvinylbutyral.

11. The method of claim 8, further comprising depositing the mixture onto a carbon allotrope material.

12. The method of claim 11, wherein the carbon allotrope material is selected from the group consisting of single-walled carbon nanotubes, carbon fibers, and combinations thereof.

13. The method of claim 1, wherein:
    the EDOT monomers are unfunctionalized monomers, and
    the transition-metal p-TSA is Fe (III) p-TSA.

14. The method of claim 1, wherein:
    the transition-metal p-TSA is Fe (III) p-TSA, and
    the DNNSA and the EDOT monomers are provided in a molar ratio of the DNNSA to the EDOT monomers of about 1 or greater.

15. The method of claim 1, wherein:
    the transition-metal p-TSA is Fe (III) p-TSA, and
    the EDOT monomers, the Fe (III) p-TSA, and the DNNSA are reacted at room temperature.

16. The method of claim 1, wherein:
    the transition-metal p-TSA is Fe (III) p-TSA, and
    the aqueous solution is a non-alkaline aqueous solution.

17. The method of claim 4, wherein the molar ratio of transition-metal p-TSA to EDOT monomers is about 1.1.

18. The method of claim 17, wherein the molar ratio of DNNSA to EDOT monomers is about 1.7.

19. The method of claim 1, further comprising:
    drying the PEDOT doped with anions at a temperature, wherein the temperature is not greater than 100° C., and
    introducing a polyvinylbutyral resin to the PEDOT doped with the anions of the DNNSA and the p-TSA to form a mixture.

20. The method of claim 1, wherein:
    the transition-metal p-TSA is Fe (III) p-TSA,
    the DNNSA and the EDOT monomers are provided in a molar ratio of the DNNSA to the EDOT monomers of about 1 or greater, the EDOT monomers, the Fe (III) p-TSA, and the DNNSA are reacted at room temperature, and
the aqueous solution is a non-alkaline aqueous solution.

* * * * *